(12) United States Patent
Pajic

(10) Patent No.: US 9,242,733 B2
(45) Date of Patent: Jan. 26, 2016

(54) TRAY TABLE WITH ARTICULATING SUPPORT

(71) Applicant: Nick Pajic, Phoenix, AZ (US)

(72) Inventor: Nick Pajic, Phoenix, AZ (US)

( * ) Notice: Subject to any disclaimer, the term of this patent is extended or adjusted under 35 U.S.C. 154(b) by 0 days.

(21) Appl. No.: 14/335,571

(22) Filed: Jul. 18, 2014

(65) Prior Publication Data

US 2015/0020715 A1    Jan. 22, 2015

Related U.S. Application Data

(60) Provisional application No. 61/847,998, filed on Jul. 18, 2013.

(51) Int. Cl.
| | |
|---|---|
| *A47B 83/02* | (2006.01) |
| *B64D 11/06* | (2006.01) |
| *B60N 2/44* | (2006.01) |
| *B64D 11/00* | (2006.01) |
| *B60N 3/00* | (2006.01) |

(52) U.S. Cl.
CPC *B64D 11/06* (2013.01); *B60N 2/44* (2013.01); *B60N 3/004* (2013.01); *B64D 11/0015* (2013.01); *B64D 11/0638* (2014.12)

(58) Field of Classification Search
CPC ......... B60N 3/004; B60N 3/002; A47B 96/02
USPC ............. 297/146, 163, 170, 173, 188.04; 108/44, 43, 32, 152, 50.01, 25, 26, 1, 108/8, 9, 50.02
See application file for complete search history.

(56) References Cited

U.S. PATENT DOCUMENTS

| | | | | |
|---|---|---|---|---|
| 2,619,395 | A * | 11/1952 | Kent ............... | 108/38 |
| 4,726,621 | A * | 2/1988 | Muller ............. | 297/146 |
| 4,938,153 | A * | 7/1990 | Maes .............. | 108/128 |
| 5,078,056 | A * | 1/1992 | McCauley ........ | 108/115 |
| 5,876,092 | A * | 3/1999 | An ................ | 297/146 |
| 5,984,347 | A * | 11/1999 | Blanc-Rosset .... | 297/146 |
| 7,500,716 | B2 * | 3/2009 | Guerin et al. .... | 297/146 |
| 7,611,198 | B2 * | 11/2009 | Schweizer ....... | 297/217.3 |
| 7,621,593 | B2 * | 11/2009 | Dickinson ....... | 297/163 |
| 7,739,963 | B2 * | 6/2010 | Chou et al. ...... | 108/44 |
| 7,963,231 | B2 * | 6/2011 | Osborne et al. ... | 108/40 |
| 7,971,929 | B2 * | 7/2011 | Kennard et al. ... | 297/146 |
| 8,905,470 | B2 * | 12/2014 | Shih et al. ....... | 297/163 |
| 8,934,063 | B2 * | 1/2015 | Boyer, Jr. ........ | 297/146 |
| 2003/0233659 | A1 * | 12/2003 | Guerin et al. .... | 725/77 |
| 2004/0125549 | A1 * | 7/2004 | Iredale .......... | 361/681 |
| 2005/0178297 | A1 * | 8/2005 | Pipkin ........... | 108/25 |
| 2006/0075934 | A1 * | 4/2006 | Ram ............. | 108/44 |
| 2007/0283855 | A1 * | 12/2007 | Pozzi ............ | 108/44 |
| 2013/0093220 | A1 * | 4/2013 | Pajic ............. | 297/163 |
| 2014/0327278 | A1 * | 11/2014 | Curtis et al. ..... | 297/163 |
| 2015/0061327 | A1 * | 3/2015 | Millan ........... | 297/163 |

* cited by examiner

*Primary Examiner* — Jose V Chen
(74) *Attorney, Agent, or Firm* — Lightbulb IP, LLC

(57) ABSTRACT

A tray table with an articulating support for portable electronic devices provides adjustable support for use of a portable electronic device at passenger seats of various forms of transportation, regardless of whether the tray table is in a stowed or service position. The articulating support comprises a plurality of rotating joints and rotating sections which combine to provide a plurality of refracted and extended positions, allowing a passenger to position his or her portable electronic device as desired. The articulating support secures the portable electronic device to prevent unwanted movement of the same, while also preserving unobstructed use of the top surface of the tray table when desired.

4 Claims, 17 Drawing Sheets

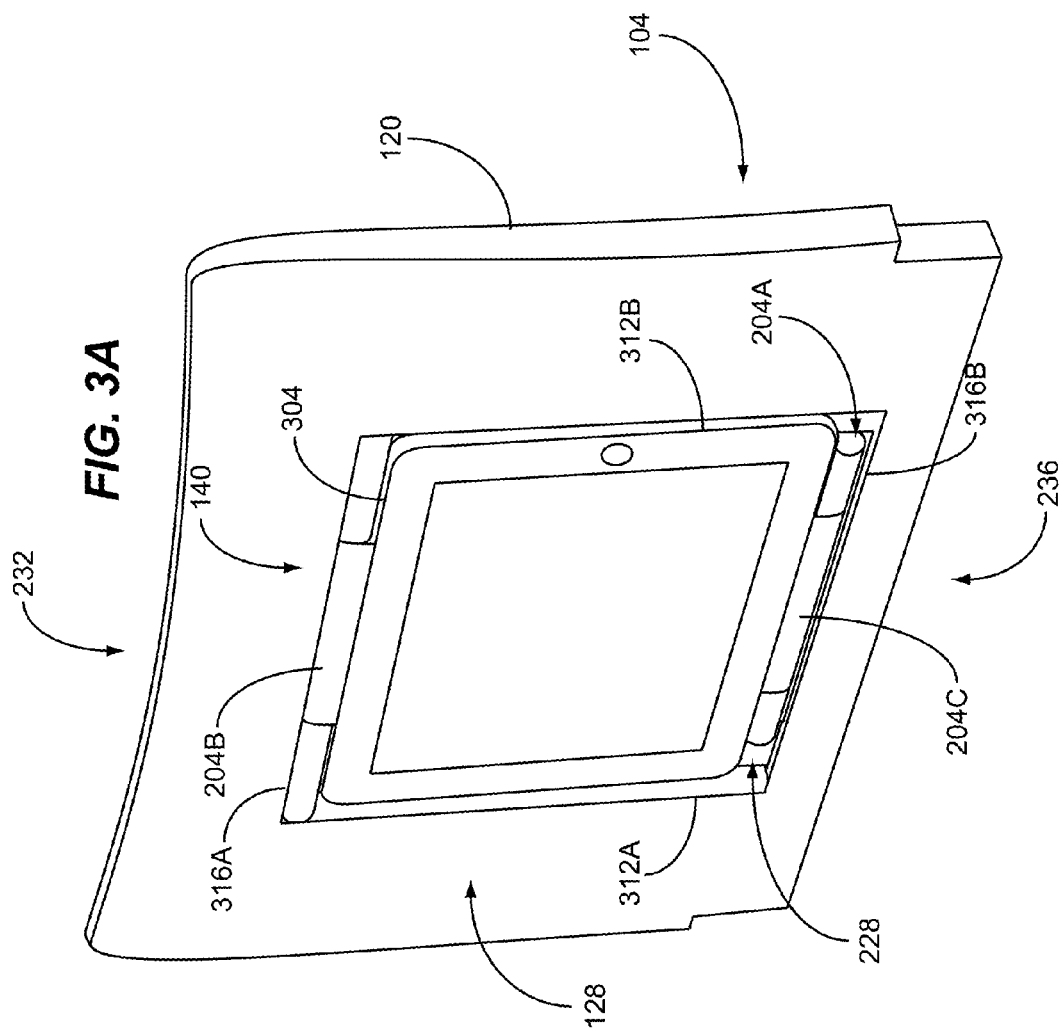

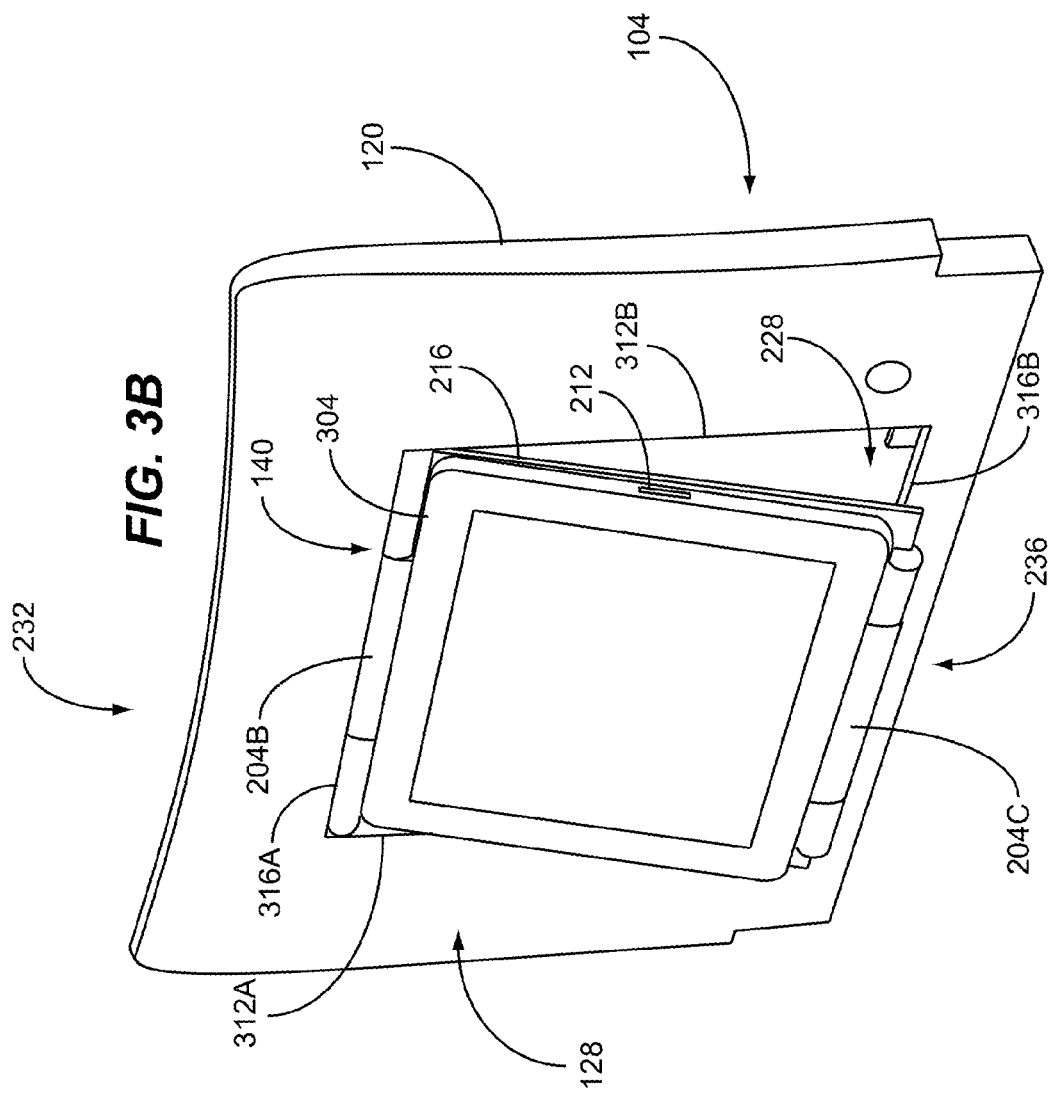

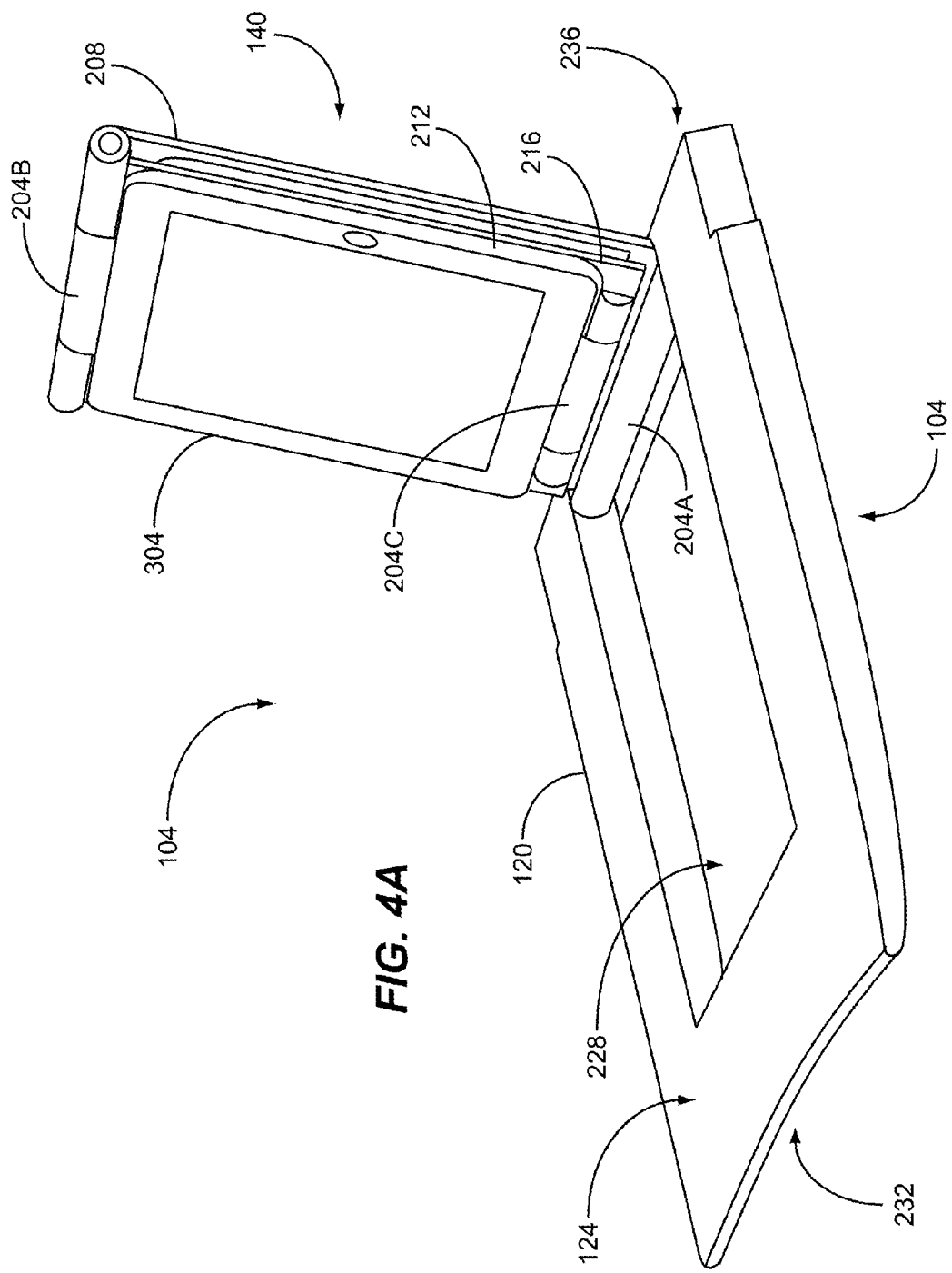

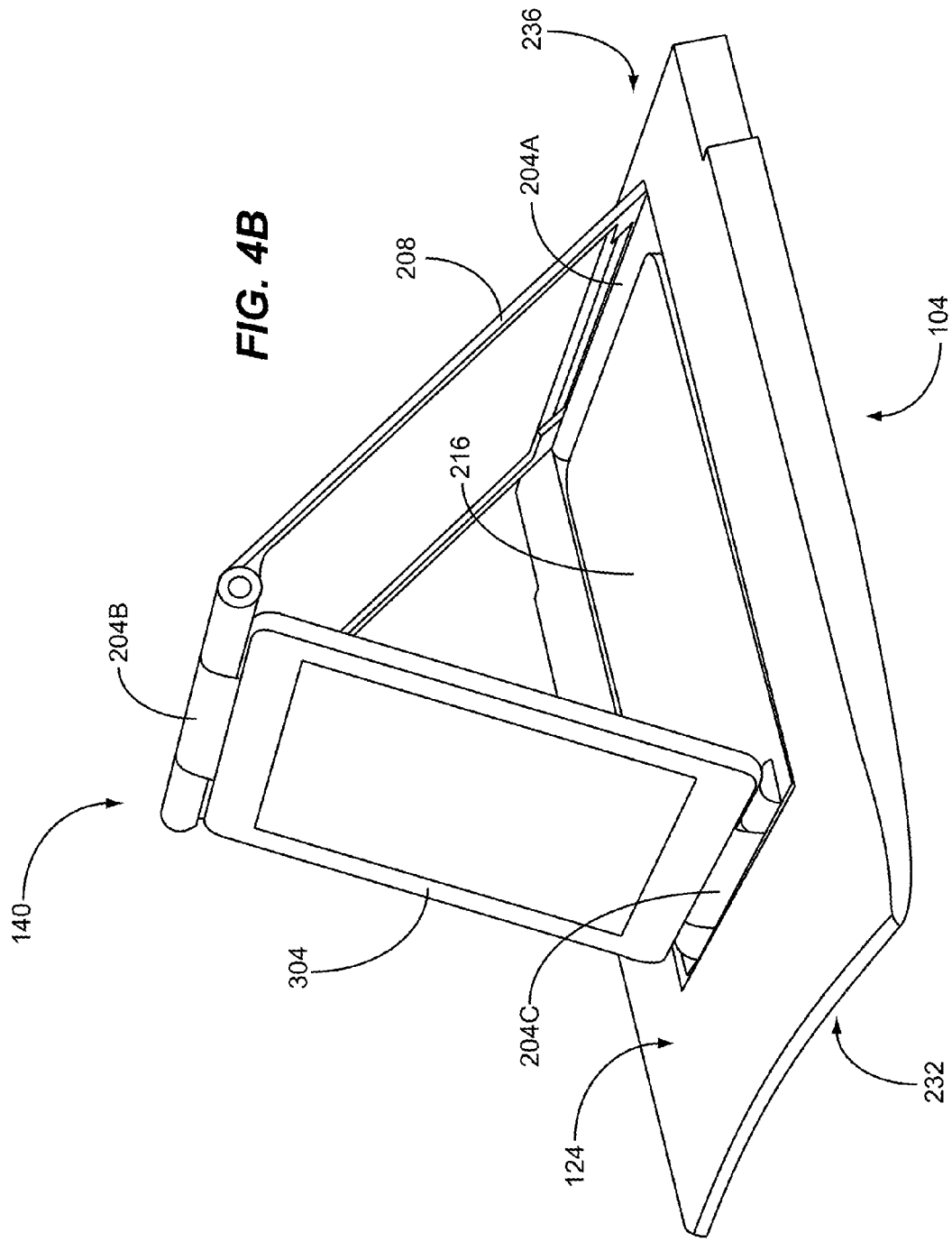

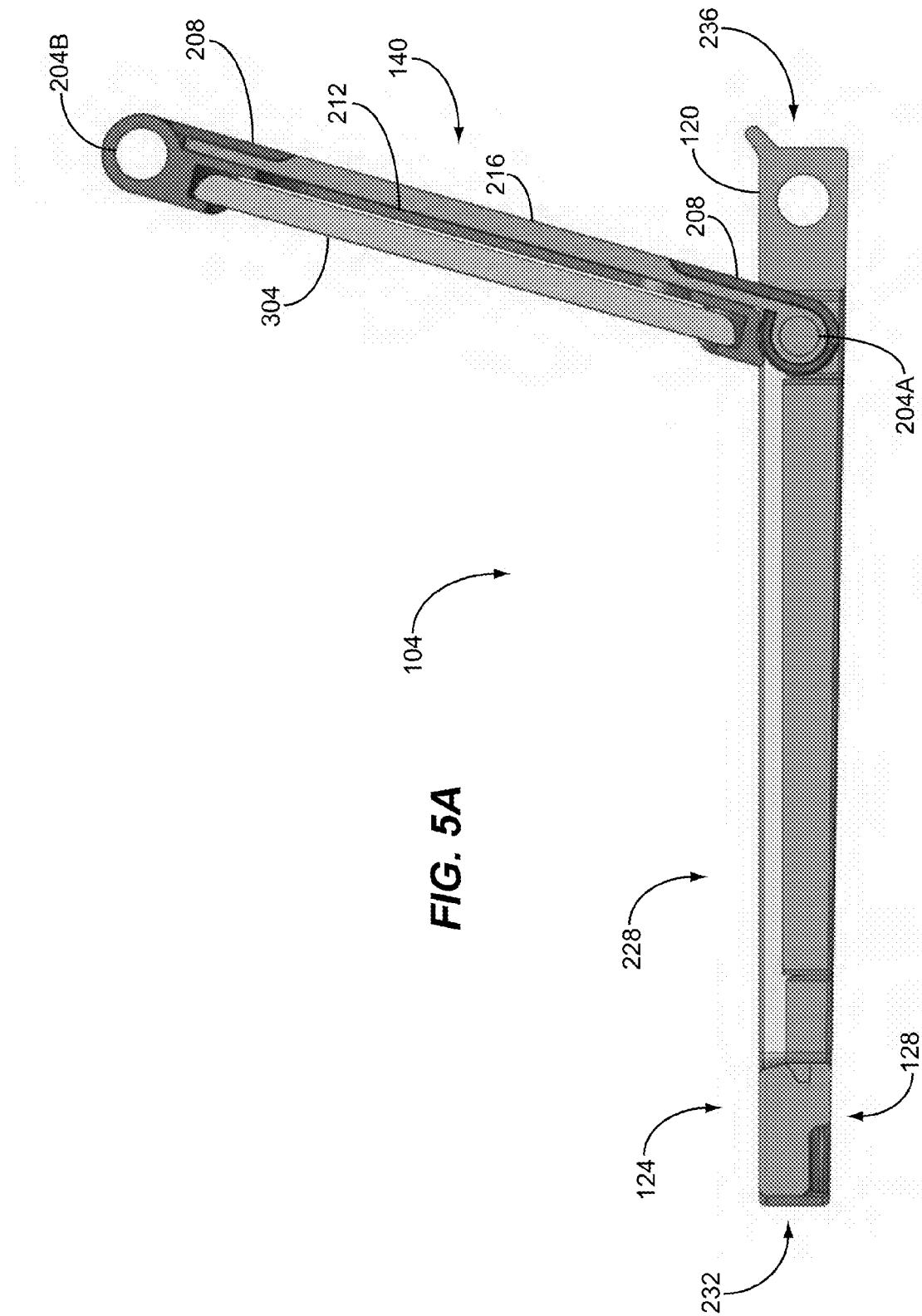

TRAY TABLE WITH ARTICULATING SUPPORT

CROSS-REFERENCE TO RELATED APPLICATION

This application claims priority to U.S. Provisional Patent Application No. 61/847,998, filed Jul. 18, 2013.

BACKGROUND OF THE INVENTION

1. Field of the Invention

The invention relates to seatback tray tables and in particular to a tray table with an articulating support for adjustably holding a portable electronic device.

2. Related Art

Airplane and other vehicle tray tables have been largely unchanged for decades. In general, such tray tables move between a stowed upright position and a service position where a tray table is generally horizontal so that items may be supported by the tray table. In the service position, the tray table may be used to support food, drink, and other items for a passenger.

Attempts have been made to update traditional tray tables. For example, U.S. Patent Publication No. 2011/0126739 discloses a portable collapsible tray table apparatus configured to provide an elevated platform upon which a user's electronic device may be supported. For instance, the tray table apparatus may support the user's laptop at an elevated position. The elevated platform may also include a removable panel that can be removed to reveal an electronic device holder for holding a user's electronic device.

As another example, U.S. Pat. No. 7,500,716 discloses a multi-function tray table having a slidable portion and an internal stationary portion. The slidable portion extends towards a passenger during use while the stationary portion does not. The stationary portion and the sliding portion are required parts of an elaborate mechanism configured to ensure that an entertainment device of the tray table is viewable when the tray table is stowed.

From the discussion that follows, it will become apparent that the present invention addresses the deficiencies associated with the prior art while providing numerous additional advantages and benefits not contemplated or possible with prior art constructions.

SUMMARY OF THE INVENTION

A tray table with an articulating support is disclosed herein. The tray table and articulating support are advantageous in that they permit use of a portable electronic device on various forms of transportation safely and securely. For example, in an unexpected emergency or severe turbulence, portable electronic devices are safely secured by their respective tray tables making the airplane cabin safer for passengers and inflight crew. As will be detailed herein, the articulating support supports and secures a portable electronic device at various positions relative to a passenger. In this manner, various use cases are preserved by the articulating support even though the passenger does not physically hold the portable electronic device during use. In addition, the articulating support is capable of providing access to, thus permitting use of, a portable electronic device regardless of whether its associated tray table is in a stowed or service position.

The tray table with an articulating support may have a variety of configurations, as disclosed herein. In one embodiment for example, the tray table may comprise a rigid body with an opening therein, and an articulating support for securing and supporting a portable electronic device at a plurality of positions. The body comprises a top surface for supporting one or more items thereon, a bottom surface, a front end, and a back end. The opening extends through the body from its top surface through to its bottom surface, and is defined by a front wall, a back wall, and two side walls at an interior portion of the body.

In a dual jointed configuration, the articulating support typically comprises a first rotating joint and a second rotating joint. A first rotating section extends between the first rotating joint and the second rotating joint. A second rotating section comprising a mount for accepting and securing the portable electronic device thereto extends from the second rotating joint.

The first rotating joint rotatably attaches the articulating support to the back wall of the opening at the back end of the body such that the articulating support is rotatable between a retracted position where the articulating support is within the opening and an extended position where the articulating support extends outward from the top surface of the body.

A third rotating section having a planar structure, may extend from the first rotating joint. The third rotating section may be used to at least partially cover the opening of the tray table when the articulating support is in an extended position. This provides a support and workspace for the passenger.

In a triple jointed configuration, the articulating support will typically include a third rotating joint attached to a distal end of the second rotating section, and a third rotating section having a planar structure, with the third rotating section extending from the third rotating joint.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3A is a side perspective view illustrating operation of an articulating support having a triple jointed configuration while in a retracted position;

FIG. 3B is a side perspective view illustrating tilting of an articulating support having a triple jointed configuration;

FIG. 4A is a side perspective view illustrating operation of an articulating support having a triple jointed configuration while in an extended position;

FIG. 4B is a side perspective view illustrating operation of an articulating support having a triple jointed configuration while in an extended position;

FIG. 5A is a side cross sectional view of an exemplary tray table with an articulating support having a dual jointed configuration;

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The tray table disclosed herein is designed to greatly enhance a passenger's inflight experience by making it easier and safer to use portable electronic devices inflight, replace complex and expensive seat embedded inflight entertainment platforms with simple and affordable portable electronic device, eliminate complex and costly logistics of getting carrier provided portable electronic devices on and off aircraft to recharge tablet device batteries between flights inside airports. In addition, communication of important pre-flight safety procedures, emergency procedures, connecting flight information, baggage arrival information can be communicated via a portable electronic device supported and secured by the tray table. This reduces the workload of already busy flight crews or other personnel and improves safety of passengers at every seat. Additionally, the lightweight structure of the tray table saves fuel and reduces carbon emissions into the atmosphere.

Passengers can also read books, inflight magazines and other literature in multiple languages on portable electronic devices at each seat. Digital content delivery thus replaces inflight magazines and other paper-based material onboard, making a paperless cabin possible. These advantages also apply to other forms of transport as described further below.

The deployment of heavy and expensive seat embedded inflight entertainment systems is losing ground quickly among airlines except in premium cabins on long haul aircraft. These complex inflight entertainment systems can range from $6,000 to $10,000 per seat, require aircraft time out of service to install, add significant weight which drives fuel cost including ongoing and expensive maintenance.

Therefore, airlines are increasingly relying on PED's owned by their passengers or provided by the airline to deliver IFE connectivity (Wi-Fi) and content (movies, TV, games, music) to each seat. But the logistics of inventory management, distribution & collection and recharging are onerous and expensive. Airlines around the globe are looking for cost effective and readily available products to meet the expectations of their customers.

Figure 1:
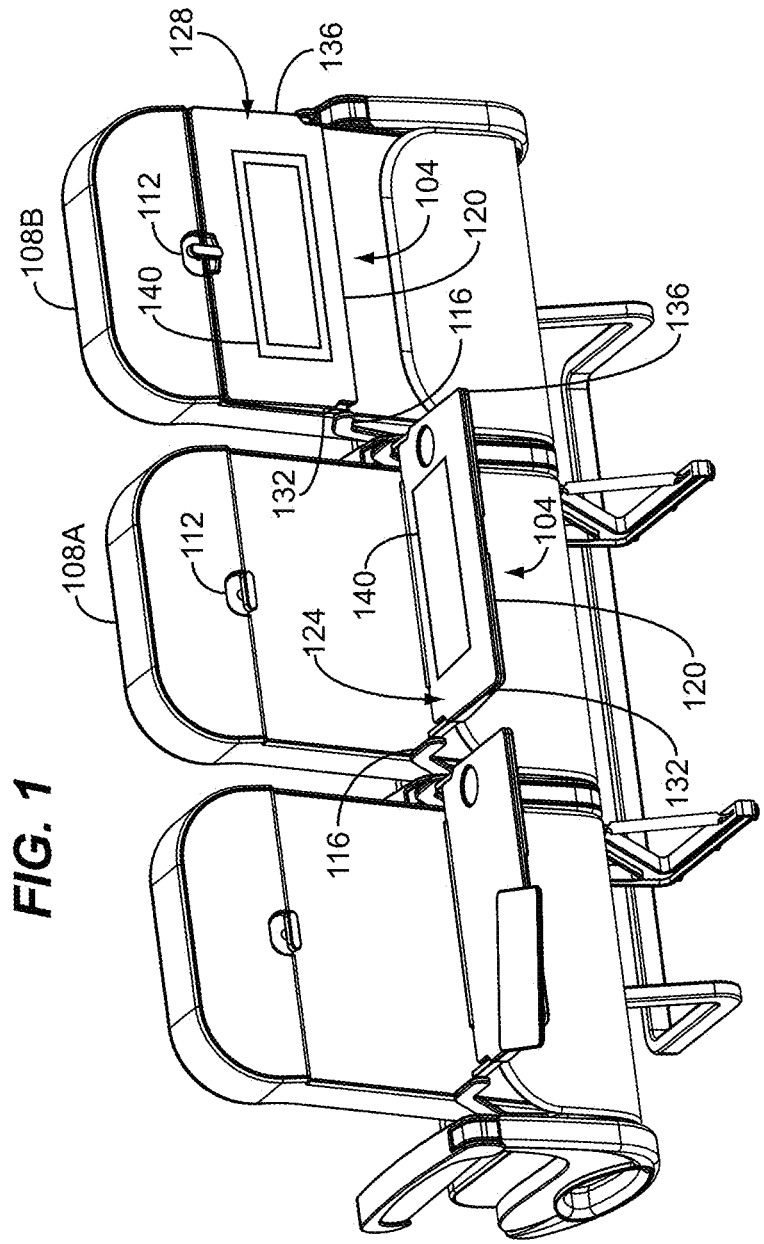
FIG. 1 is a perspective view of various tray tables with articulating mounts in an exemplary environment of use.

Referring to FIG. 1, the tray table 104 herein is configured to provide a surface for supporting one or more items as desired by a passenger (or other user). Typically, the tray table 104 will be attached to a passenger seat 108, at the back of the passenger seat. The tray table 104 may be attached to one or more passenger seats 108 of various forms of transportation. For example, it is contemplated that the tray table may be used in airplanes, trains, busses, taxis, limos, ferries, and other forms of public transport as well as in personal vehicles, such as cars, trucks, and boats.

The tray table 104 will generally be in a horizontal orientation when in its service position, such as shown by seat 108A, and in a substantially vertical position when in its stowed position, such as shown by seat 108B. The tray table 104 may be secured to the back of a passenger seat 108B when in its stowed position. A passenger may release the tray table, such as by turning or otherwise disengaging one or more locking mechanisms 112, and then move the tray table 104 to its service position. Typically, this locates the tray table 104 closer to the passenger.

The tray table 104 will typically be supported by one or more rotating or movable mounting arms 116, which allow the tray table to be moved between the stowed position and the service position. The mounting arms 116 may be attached at their proximal ends to a passenger seat 108 by one or more pivots, hinges or other rotating mounts. The mounting arms 116 may be attached to the tray table 104 at their distal ends via one or more pivots, hinges, or other rotating mounts as well. In addition, it is contemplated that a sliding extension may be at the distal end of the mounting arms 116 to allow the tray table 104 to be moved toward or away from a passenger when in the service position.

As can be seen, the tray table 104 comprises a body 120 having a top surface 124, a bottom surface 128, a left side 132 and a right side 136. In use, the top surface 124 can be used to support various items as desired by a passenger. For example, passengers would typically place food, reading material and other items on the top surface 124 when the tray table 104 is in a service position. One drawback however is that the top surface 124 does not secure items placed thereon and thus, in the event of turbulence or other movement, items on the top surface may move about or slide off the tray table 104 entirely.

The tray table 104 also includes an articulating support 140 configured to support and secure portable electronic devices. Typically, a portable electronic device will be a tablet, such as for example the iPad™, and allow a passenger to consume various media, including media stored on a storage device of a vehicle, media retrieved from the Internet or other network, or on the portable electronic device itself. To illustrate, a portable electronic device may retrieve and present various media from an inflight entertainment server of an aircraft, from the Internet, or from its own internal storage device. It is contemplated that various other portable electronic devices may be supported and secured by the articulating support 140 as well, including smart phones, video gaming devices, and media players.

As will be described further below, the articulating support 140 is advantageous in that it supports and secures a portable electronic device for convenient use by a passenger regardless of the position (e.g., service position or stowed position) of its associated tray table 104. In addition, since the portable electronic device is secured by the articulating support 140, there is no risk of the portable electronic device falling from the tray table 104 or moving about. The passenger is thus free to enjoy use of the portable electronic device.

Figure 2A:
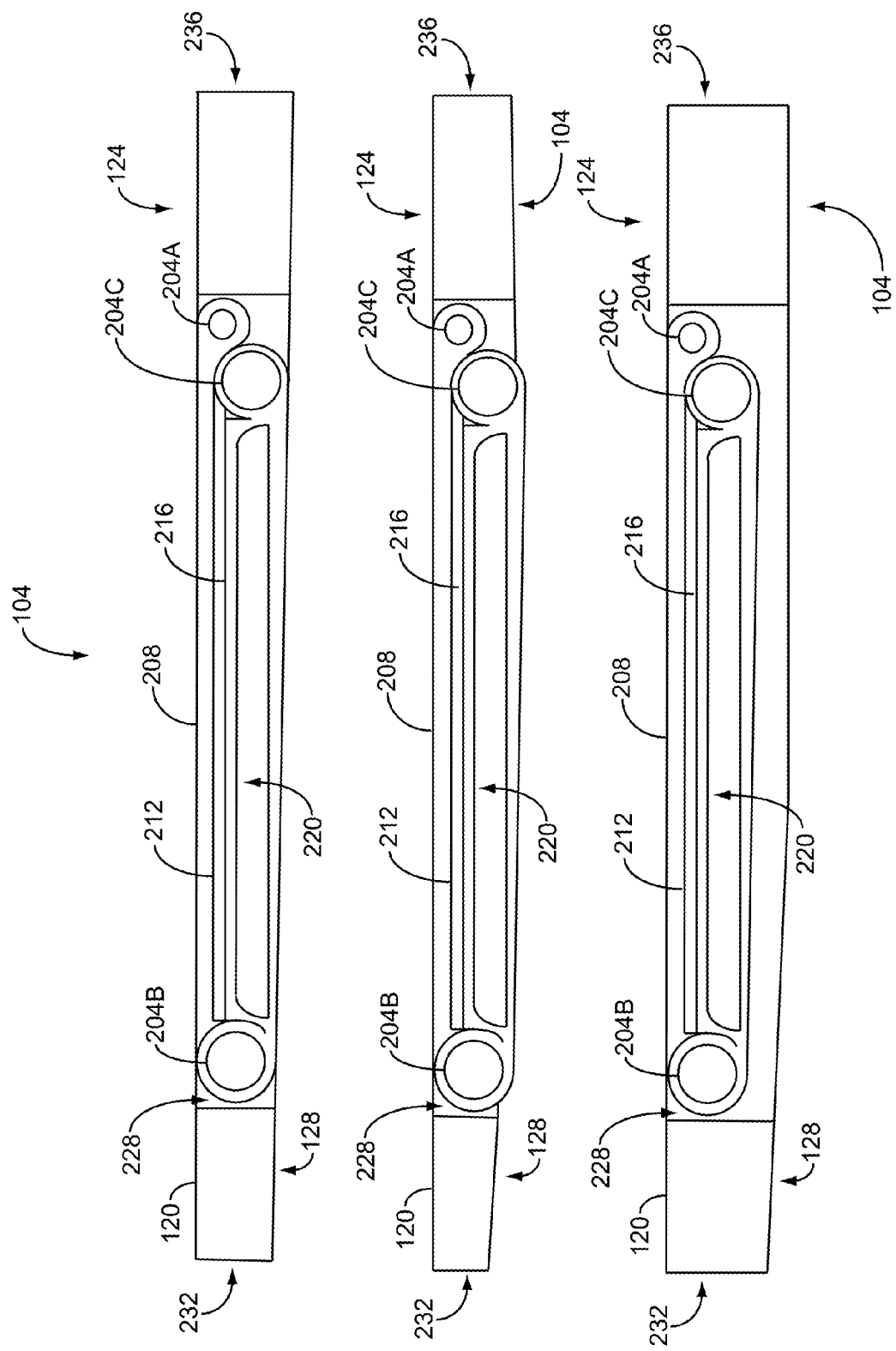
FIG. 2A is a side cross sectional view of various exemplary tray tables with articulating supports having a triple jointed configuration.
Figure 2B:
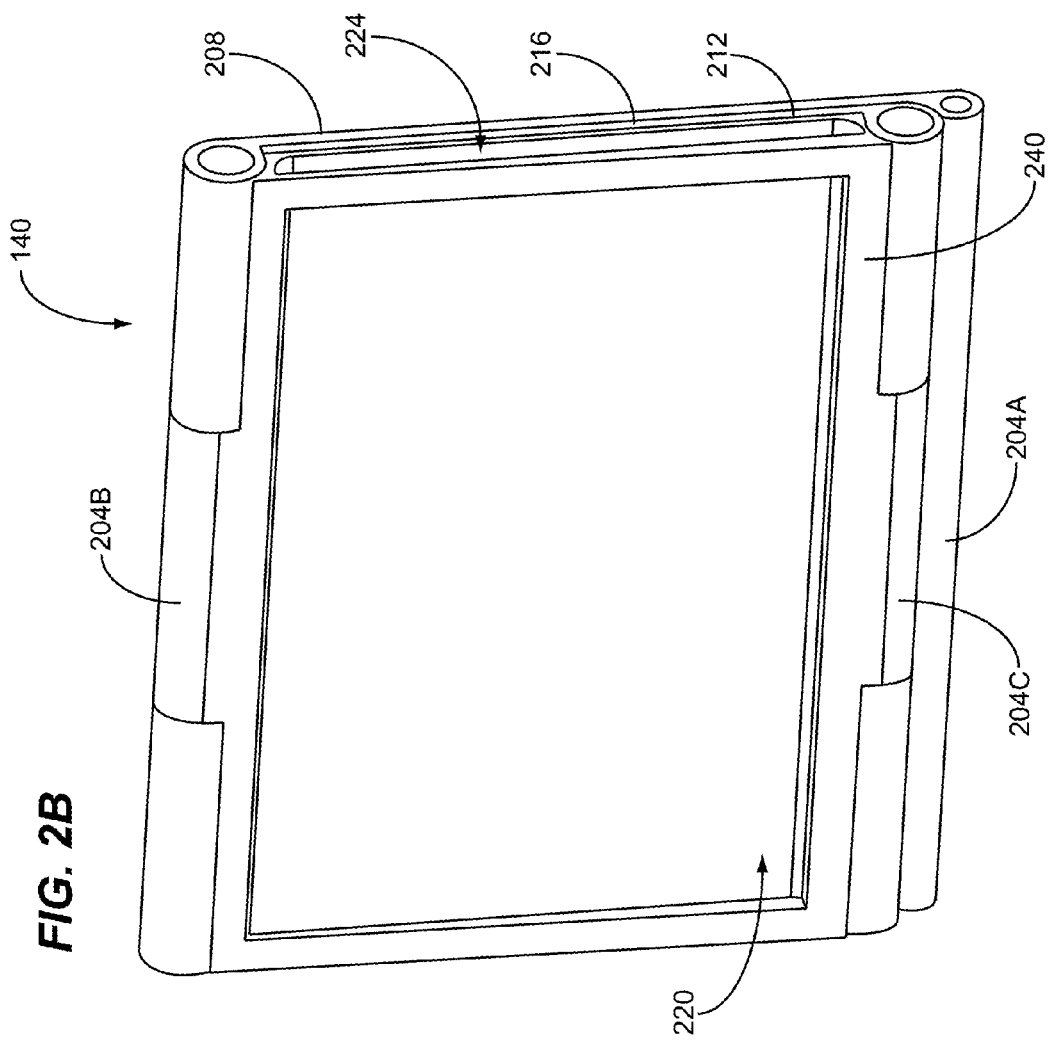
FIG. 2B is a front perspective view of an exemplary tray table with an articulating support having a triple jointed configuration.

Further details regarding the tray table 104 and positions of its articulating support 140 will now be described. Referring to FIGS. 2A-2B, which respectively provide a side cross sectional view and a perspective view of the tray table 104 and articulating support 140, it can be seen that the articulating support can be fully retracted into an opening 228 in the body 120 of the tray table. As can be seen, the articulating support 140 is configured to be flush with the top surface 124 of the tray table when in a retracted position. This is advantageous in that it provides a planar surface at the top surface 124 of the tray table 104 for supporting one or more items.

In one or more embodiments, the articulating support 140 may comprise a plurality of rotating sections 208, 212, 216. These sections may be joined by one or more pivots, hinges, or other rotating joints 204A, 204B, 204C. In the embodiment of FIGS. 2A-2B, it can be seen that the articulating support 140 comprises three rotating sections 208, 212, 216 joined together by two rotating joints 204B, 204C. A third rotating joint 204A may be provided to rotatably attach the articulating support 140 to the body 120 of the tray table 104. As will be described further below, the rotating sections 208, 212, 216 may be connected such that they form a telescopic structure capable of extending and retracting.

A rotating joint 204A, 204B, 204C may itself comprise an axel or pin that provides a pivot point for rotatable wings or sections of the rotating joint. The rotatable wings may wrap around or otherwise by rotatably attached to the axel. Typically, a rotating joint 204A, 204B, 204C is installed by attaching a first of its rotatable wings to an end of a rotating section 208, 212, 216 and a second of its rotatable wings to an end of another rotating section thereby allowing the rotating wings to pivot/rotate relative to one another. A rotating joint 204A, 204B, 204C may have a third or more rotatable wings as well. This allows three or more rotating sections 208, 212, 216 to be attached to a single rotating joint 204A, 204B, 204C, such as described below with regard to a dual joint configuration of the articulating support 140.

Each rotating section 208, 212, 216 may have an elongated structure to span a distance between the rotating joints 204A, 204B, 204C. In one or more embodiments, the length of each rotating section 208, 212, 216 may be defined generally by the width or length dimension of a portable electronic device. To illustrate, as can be seen, the articulating support's second rotating section 212 comprises a mount 220 configured to accept and securing a portable electronic device. Therefore, the length of the second rotating section 212 must be at least as long as the width or length dimension of the portable electronic device. The first and third rotating sections 208, 216 can then be sized accordingly, to provide the functionality described herein.

As shown in FIGS. 2A-2B, the second rotating section 212 includes a mount 220 for accepting and securing a portable electronic device. In this embodiment, the mount 220 comprises a compartment, which physically receives at least a portion of the portable electronic device. It is contemplated that the mount 220 may cover the bezel or other peripheral portion of the portable electronic device to secure the portable electronic device.

In the embodiment of FIG. 2B for example, the mount 220 includes an opening 224 through which a portable electronic device may be inserted into the mount. Once in the mount 220, the portable electronic device is secured by a rectangular frame 240 which covers at least a portion of the bezel of the portable electronic device. The frame 240 prevents the portable electronic device from falling out of the mount 220 in this manner. The portable electronic device may then be removed by sliding or moving the portable electronic device such that it exits the opening 224.

Other mechanisms for securing the portable electronic device within the mount 220 may be used as well. In one or more embodiments, the mount 220 may conform to the shape of the portable electronic device, to form a friction fit or a snap in fit that both accepts and secures the portable electronic device to the mount 220. In some embodiments, the mount 220 may include one or more magnets to magnetically secure a portable electronic device to the mount. Typically such magnets will be positioned to magnetically engage one or more magnets present within the portable electronic device itself.

It is noted that the mount 220 may be configured to allow passengers to insert, secure, and remove their own portable electronic devices. For example, the friction or snap in fit configurations disclosed above, may be used for such purposes. In other embodiments, a portable electronic device may be affixed to the mount 220 such that it may only be removed by authorized personnel, such as maintenance or administrative personnel. In such embodiments, it is contemplated that the portable electronic device may be encased within the mount 220 (while allow its screen to be accessible for use).

It is contemplated that a mount 220 may also comprise various connectors for transfer of communication signals or electrical power. If provided, a connector would be positioned such that it engages a corresponding data or electrical port (or combined data/electrical port) of a portable electronic device when secured by the mount 220. One or more magnets or alignment structures may be provided to ensure a proper connection between a portable electronic device and a connector. Accordingly, one or more conduits may be within the articulating support 140 configured to carry communications, electrical power, or both to a portable electronic device. Such conduits may terminate at an appropriate connection at a passenger seat or at the tray table 104.

Figure 4C:
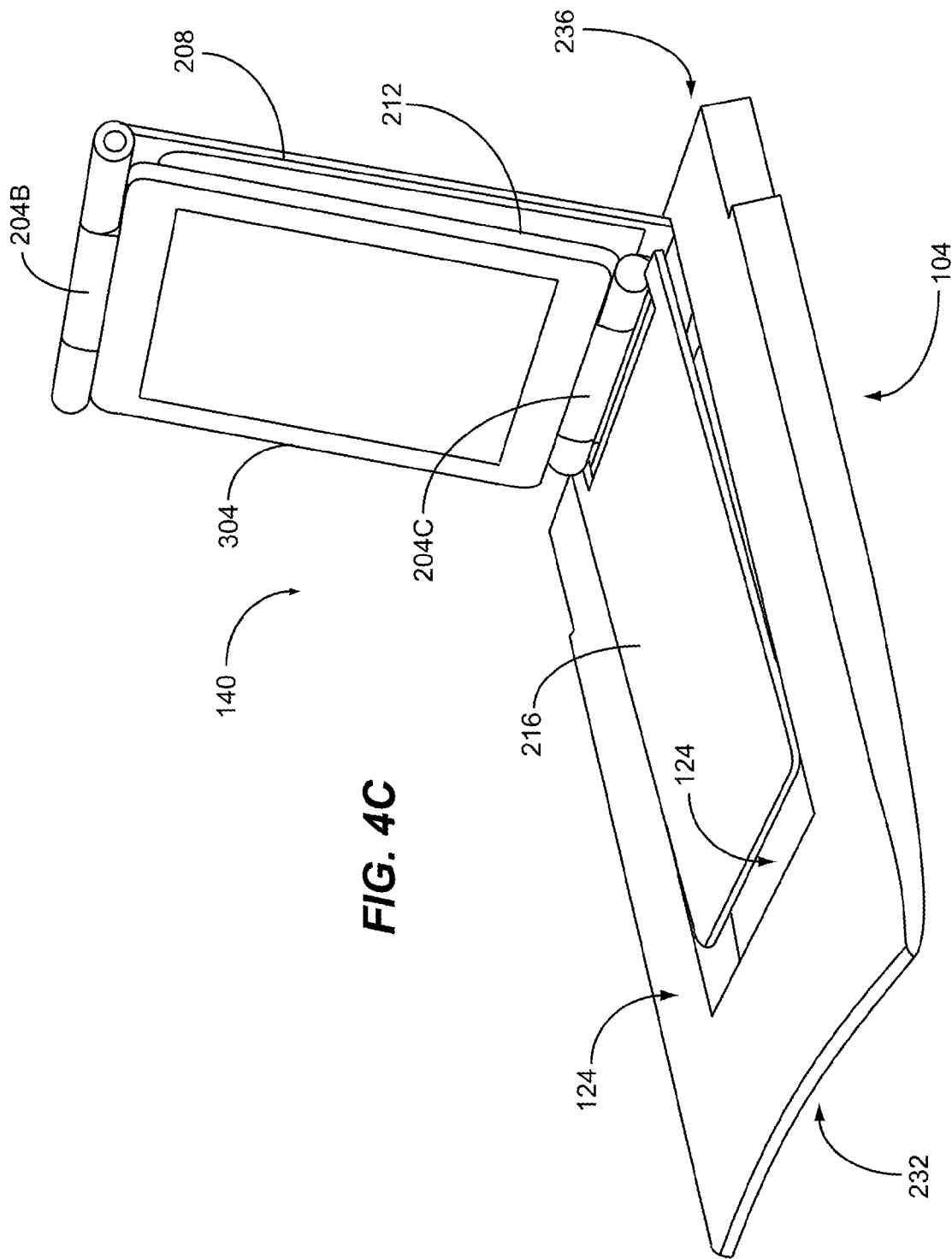
FIG. 4C is a side perspective view illustrating operation of an articulating support having a triple jointed configuration while in an extended position.

Operation and further details regarding the structure of the tray table 104 and its articulating support 140 will now be described with regard to FIGS. 3A-3B and FIGS. 4A-4C. As can be seen, FIGS. 3A-3B illustrate the articulating support 140 and operation thereof while the tray table 104 is in a stowed position, while FIGS. 4A-4C illustrate the articulating support and operation thereof while the tray table is in a service position.

Referring to FIG. 3A, it can be seen that the articulating support 140 is installed within an opening 228 formed in the body 120 of the tray table 104. The opening 228 is defined by internal front and back walls 316A, 316B and two internal side walls 312A, 312B. As can be seen, the opening 228 may be shaped to conform to the peripheral shape of an articulating support 140. For instance, the opening 228 shown has a rectangular shape corresponding in dimension to that of the articulating support 140. This allows the articulating support 140 to fit snugly within the opening 228, while also allowing the articulating support to provide a flush surface at the top surface of the tray table 104, when in a retracted position (as shown and described above with regard to FIG. 2A).

Typically, the first rotating mount 204A will rotatably attach the articulating support 140 to the body 120 of the tray table 104 at the back end 236 of the tray table 104. For instance, the first rotating mount 204 may be attached to the internal back wall 316B, or to both side walls 312A, 312B at the back end 236 of the tray table 104. This permits the rotation of the articulating support 140 as described herein.

In the stowed position, the opening 228 allows a portable electronic device 304 to be accessible at the bottom 128 of the tray table 104. In this manner, a passenger can view media presented by the portable electronic device 304 while his or her tray table 104 is stowed. Referring to FIG. 3B, it can be seen that the articulating support 140 allows the passenger to adjust the passenger's viewing angle of the portable electronic device 304 by providing tilt functionality. As can be seen, this tilt functionality is provided by the second rotating joint 204B which permits the second and third sections 212, 216 of the articulating support 140 to rotate thus allowing the passenger's viewing angle to be adjusted. While utilizing the tilt functionality, it is noted that the first rotating joint 204A and first rotating section 208 typically remain in position (i.e., in their retracted position as shown in FIG. 2A.

Referring to FIGS. 4A-4C, it can be seen that the articulating support 140 may also be used to support and secure a portable electronic device 304 at various positions while its tray table 104 is in a service position. In FIG. 4A for instance, the articulating support 140 has been rotated from a refracted position to an extended position. Specifically, the articulating support 140 has been extended upward by rotating it about the first rotating joint 204A. This orients the portable electronic device 304 at an upright position at the back end 236 of the tray table 104. As can also be seen from FIG. 4A, the first rotating joint 204A attaches the articulating support 140 to the tray table 104 at the side walls 312A, 312B of the tray table's opening 228. To achieve this extended position the articulating support 140 has only been rotated about its first rotating joint 204A.

Referring to FIG. 4B, it can be seen that the articulating support 140 is configured also to support and secure a portable electronic device 304 at an upright orientation near at the front end 232 of the tray table 104. To achieve this extended position, the first, second, and third rotating joints 204A, 204B, 204C have been rotated along with their attached sections 208, 212, 216. Specifically, to achieve this extended position, a passenger may begin by extending the articulating support 140 such as shown in FIG. 4A. The second rotating section 212 may then be rotated forward towards the front end 232 of the tray table 104 about the second rotating joint 204B. The first rotating section 208 may also be rotated forward about the first rotating join 204A.

In this manner, the bottom 404 of the second rotating section 212 can be positioned adjacent and engage a portion of the front wall 316A of the tray table's opening 228. This holds the articulating support 140 (and portable electronic device 304) in the extended position shown in FIG. 4B. It is noted that a tab, shelf or other support may be at the front wall 316A to engage the bottom 404 of the second rotating section 212 to hold the articulating support 140 in the extended position of FIG. 4B.

The third rotating section 216 of the articulating support 140 may be rotated downward about the third rotating join 204C, such as shown. Alternatively, it is noted that the third rotating section 216 may remain in a retracted position behind an generally parallel with the second rotating section 212. If rotated downward, one or more items may be placed on the third rotating section 216 as desired by a passenger.

As can be seen, the extended position of FIG. 4B positions the portable electronic device 304 closer to a passenger. In this manner, the passenger can more easily interact with the portable electronic device 304 and the media presented thereon. It is contemplated that the passenger may move the articulating support 140 back to the extended position of FIG. 4A if additional workspace in front of the portable electronic device 304 is desired, such as for a keyboard or other peripherals or documents, as will now be described with regard to FIG. 4C.

FIG. 4C illustrates an extended position where the third rotatable section 216 may be used to support one or more items in front of a portable electronic device 304. As can be seen, the third rotatable section 216 extends between the front and back end 232, 236 of the tray table 104 in this extended position. In addition, the third rotatable section 216 may be co-planar or generally co-planer with the top surface 124 of the tray table 104 providing an uninterrupted workspace for a passenger.

To achieve this extended position, the articulating support 140 may first be rotated upward about its first rotating joint 204A to a position such as shown in FIG. 4A. The third rotating section 216 may then be rotated about the third rotating joint 204C such that it extends forward toward the front end 232 of the tray table 104. It is noted that the second rotating section 212 may need to be rotated upward at least partially from its position in FIG. 4A, to permit the third rotating section 216 to be rotated forward toward the front end 232 of the tray table 104. Thereafter the second rotating section 212 may be retracted such that it is adjacent and generally parallel with the first rotating section 208, such as shown in FIG. 4C.

It is contemplated that the rotating joints 204A, 204B, 204C may be configured to freely rotate in some embodiments. In other embodiments, a rotating joint 204A, 204B, 204C may have a limited range of rotation. This limits the range of motion for a rotating section 208, 212, 216 attached thereto. In addition, a limited range of motion allows a rotating joint 204A, 204B, 204C to support a rotating section 208, 212, 216 at a particular position. To illustrate, the third rotating joint 204C of FIG. 4C shows a limited range of motion supporting the third rotating section 216 at a horizontal position substantially co-planar with the top surface 124 of the tray table 104. In this manner, the third rotating section 216 can support one or more items thereon by virtue of the fact that it is held in position by the limited range of motion of the third rotating joint 204C.

It is also contemplated that one or more rotating joints 204A, 204B, 204C may have biasing mechanisms configured to move the rotating joints in a predefined direction (if unopposed). For example, a rotating joint 204A, 204B, 204C may include a spring or other biasing mechanism to cause the rotating joint to automatically extend or retract if such motion is unobstructed or unopposed. In addition, various of the rotating joints 204A, 204B, 204C may include a locking mechanism to secure a rotating joint at its current position until the locking mechanism is released.

Figure 5B:
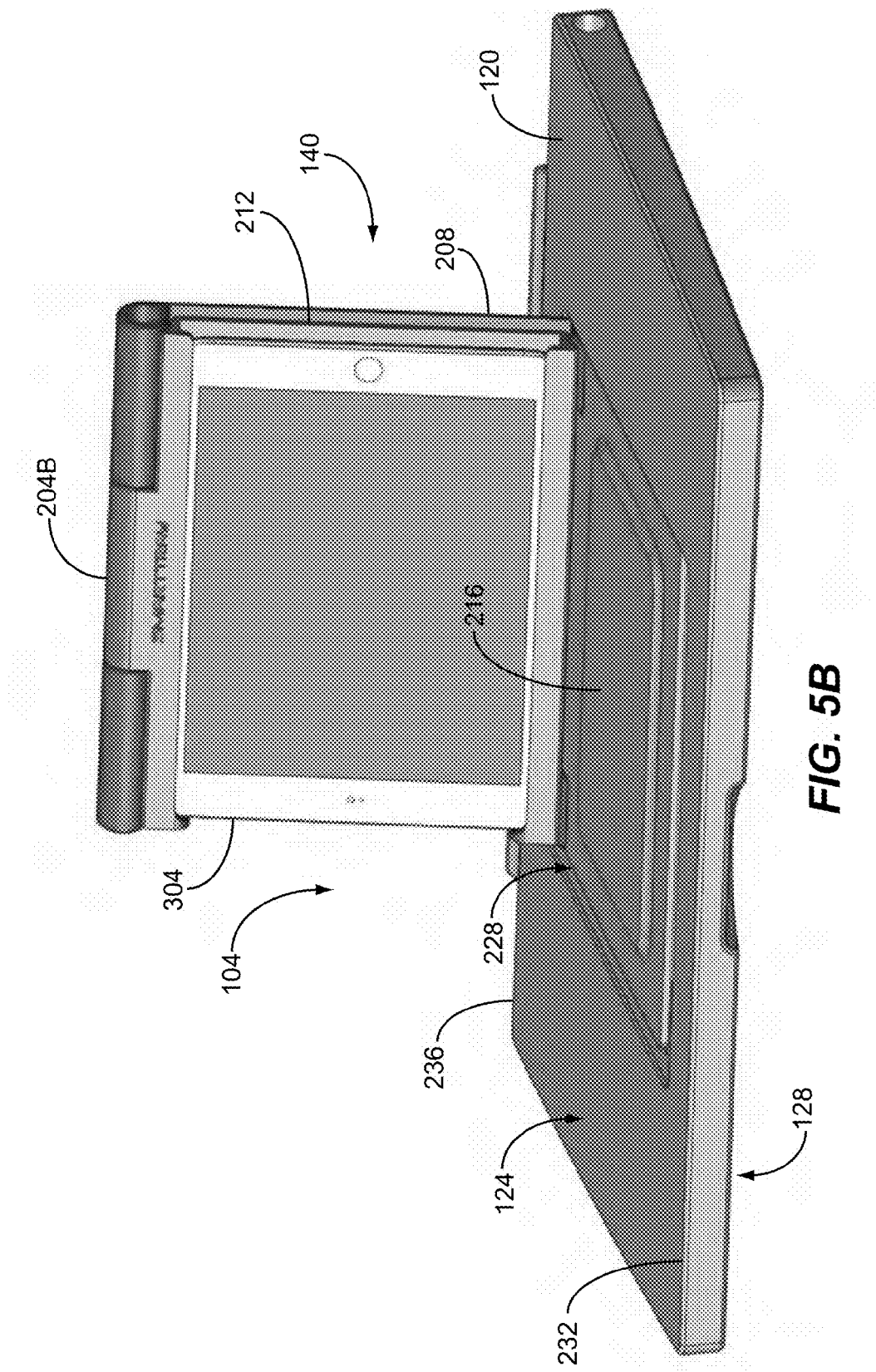
FIG. 5B is a front perspective view of an exemplary tray table with an articulating support having a dual jointed configuration.

In some embodiments, the articulating support 140 may include fewer rotating joints, as will now be described. FIGS. 5A-5B, which respectively provide a side and front perspective view, illustrate an embodiment of an articulating support 140 having two rotating joints, namely a first rotating joint 204A and a second rotating joint 204B. As can be seen, the first rotating joint 204A attaches the articulating support 140 to the body 120 of the tray table 104, similar to the above embodiments. In this manner, the articulating mount can be retracted and extended relative to the tray table's body 120, as will be described further below.

Also similar to above, a dual-rotating joint configuration will typically include three rotating sections 208, 212, 216. A first rotating section 208 typically extends between the first rotating joint 204A and the second rotating joint 204B, while a second rotating section 212 supports and secures a portable electronic device 304. A third rotating section 216 may be included to provide a support or workspace in front of the portable electronic device 304, such as shown in FIG. 5B. In a dual-rotating joint configuration, the third rotating section 216 is also attached at its proximal end to the first rotating joint 204A. It is noted that in all embodiments the third rotating section 216 may be optional.

Figure 6A:
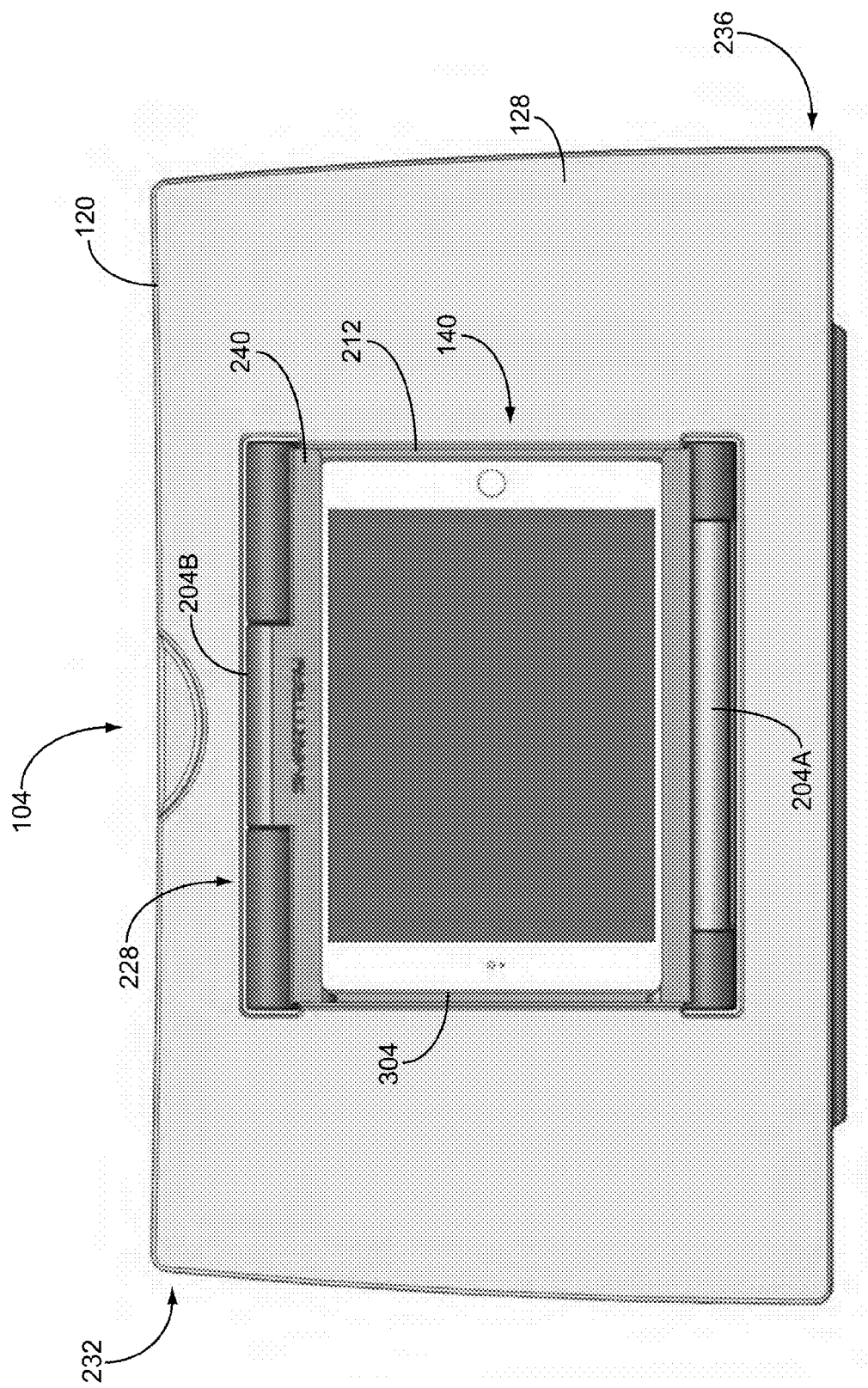
FIG. 6A is a front perspective view illustrating operation of an articulating support having a dual jointed configuration while in a retracted position.

Operation of the articulating support 140 will now be described with regard to FIGS. 6A-6C, which illustrate the articulating support in a retracted position along with the tilting capabilities of the articulating support. Referring to FIG. 6A, which illustrates a tray table 104 having the articulating support 140 in a stowed position, it can be seen that the articulating support secures a portable electronic device 304 such that it is accessible at the bottom surface 128 of the tray table 104. Namely, the portable electronic device 304 is accessible at the opening 228 of the tray table 104.

Figure 6B:
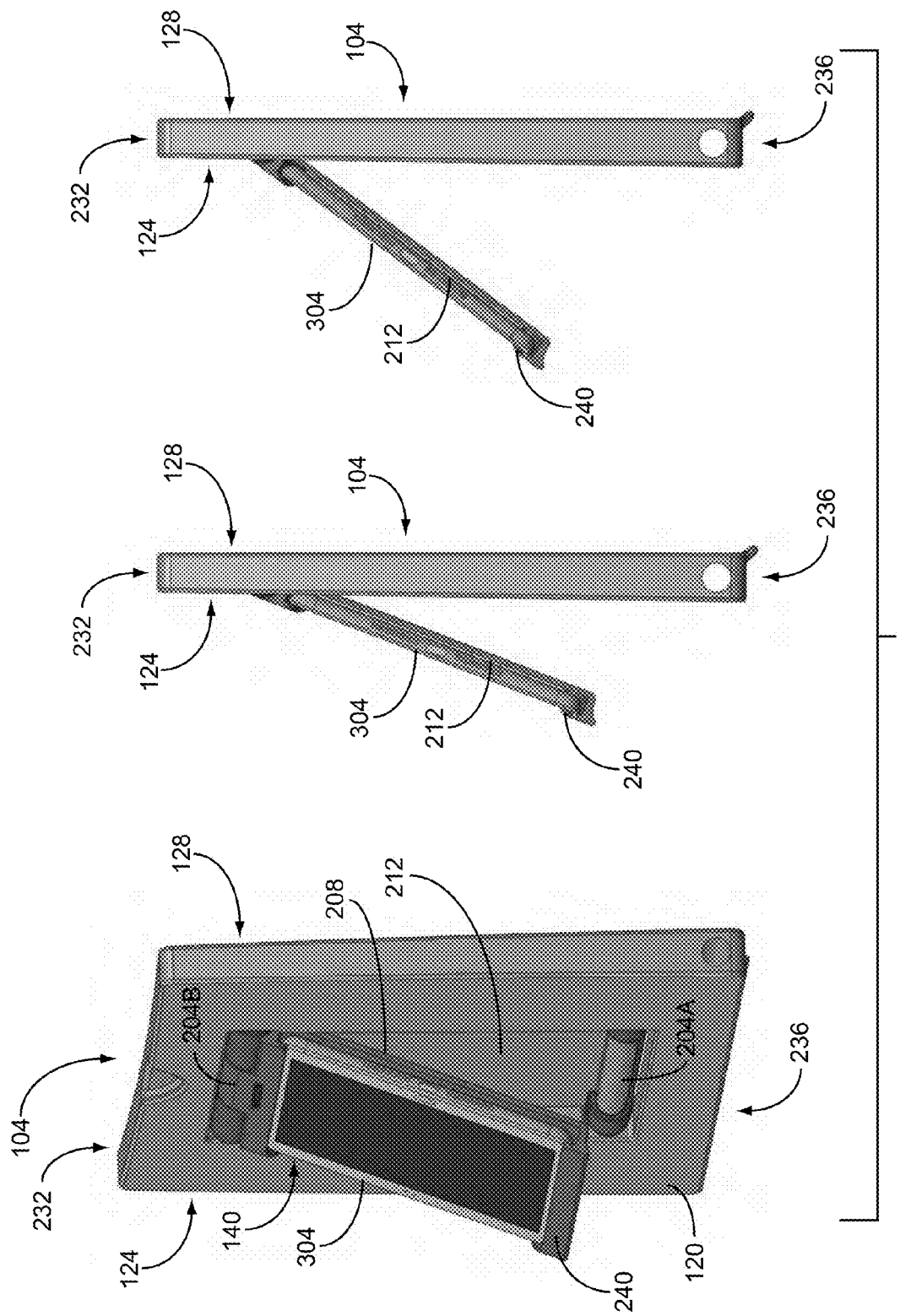
FIG. 6B illustrates a side views illustrating tilting of an articulating support having a dual jointed configuration.

Referring to FIG. 6B, it can be seen that the articulating support 140 provides a tilt capability whereby the viewing angle of the portable electronic device 304 is adjustable by rotating the second rotating section 212 about the second rotating joint 204B. FIG. 6B illustrates a perspective and two side views showing various tilt angles.

Figure 6C:
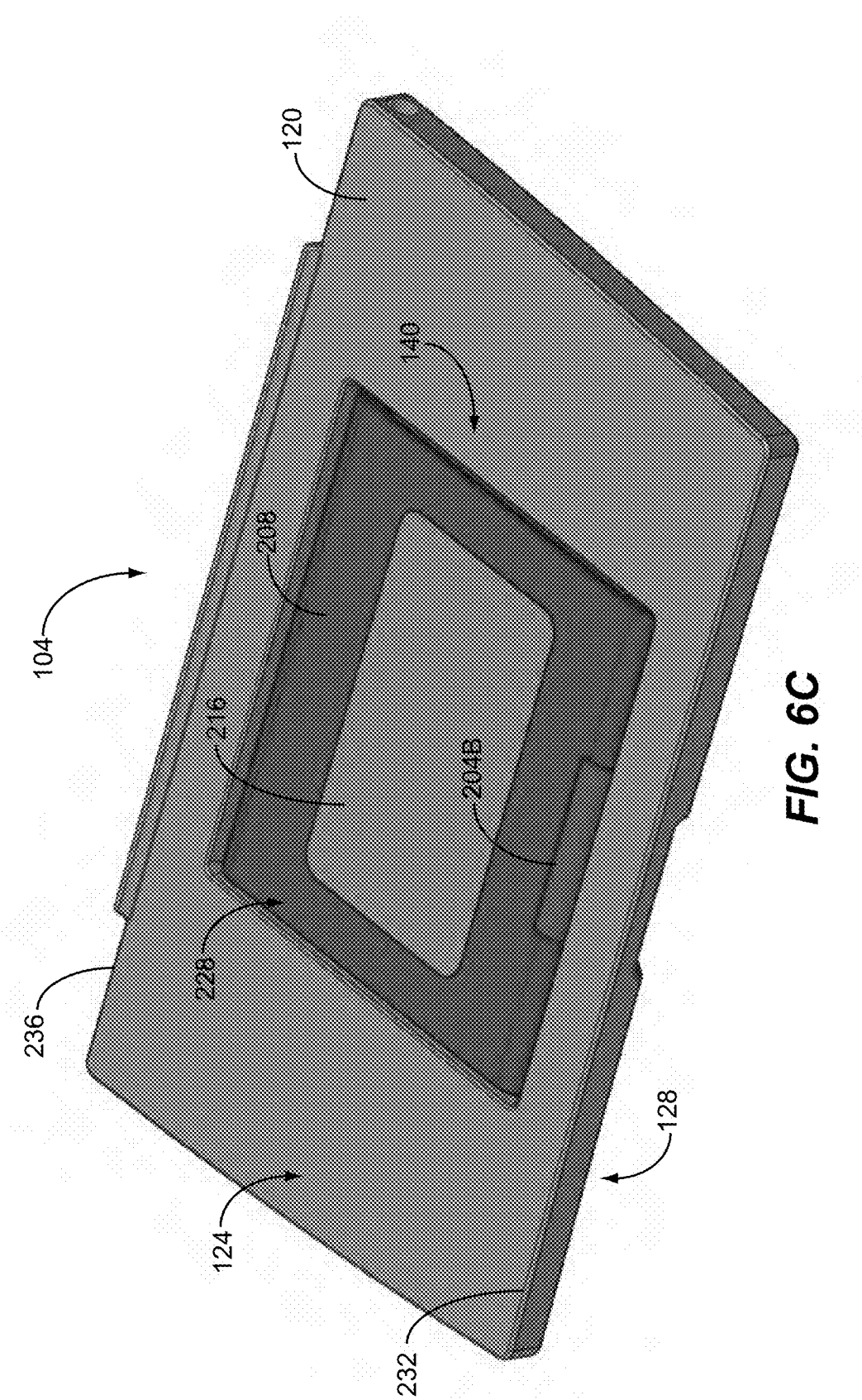
FIG. 6C is a top perspective view illustrating operation of an articulating support having a dual jointed configuration while in a retracted position.

Referring to FIG. 6C, which provides a top perspective view of a tray table 104 having an articulating support 140, it can be seen that the articulating support provides a surface generally coplanar with the top surface 124 of the tray table 104 when the articulating support is in a retracted position.

Figure 7A:
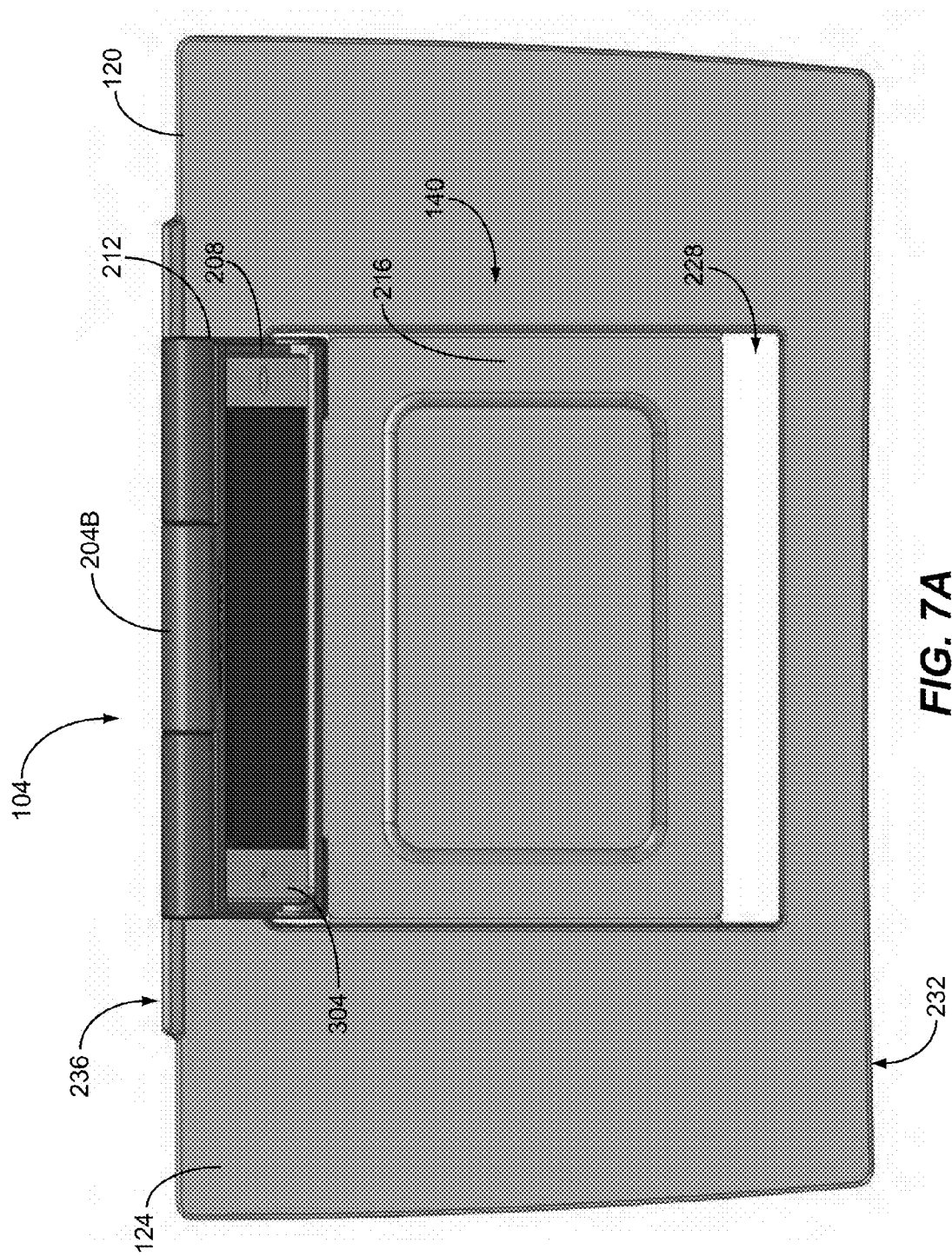
FIG. 7A is a top view illustrating operation of an articulating support having a dual jointed configuration while in an extended position.

As described above, the articulating support 140 may be extended to provide access to a portable electronic device 304 supported and secured therein. Referring back to FIGS. 5A-5B for example, it can be seen that the articulating support 140 may be extended by rotating the articulating support 140 about the first rotating joint 204A, resulting in the extended position shown in FIGS. 5A-5B. FIG. 7A illustrates a top view of this extended position. As can be seen, the third rotating section 216 spans the opening 228 of the tray table 104 to provide a support or workspace in front of the portable electronic device 304 where one or more items may be placed.

Figure 7B:
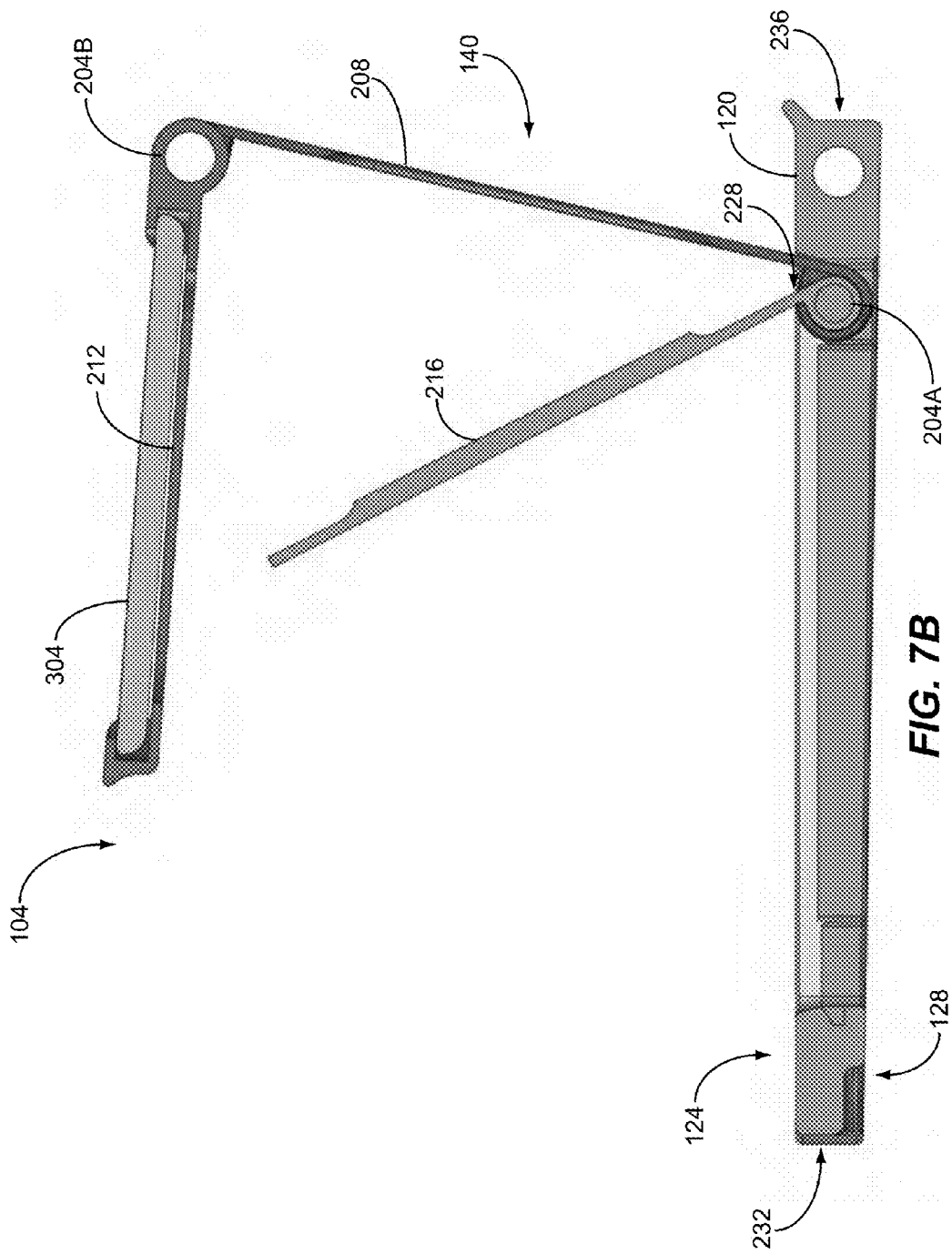
FIG. 7B is a side cross sectional view illustrating operation of an articulating support having a dual jointed configuration while in an extended position.
Figure 7C:
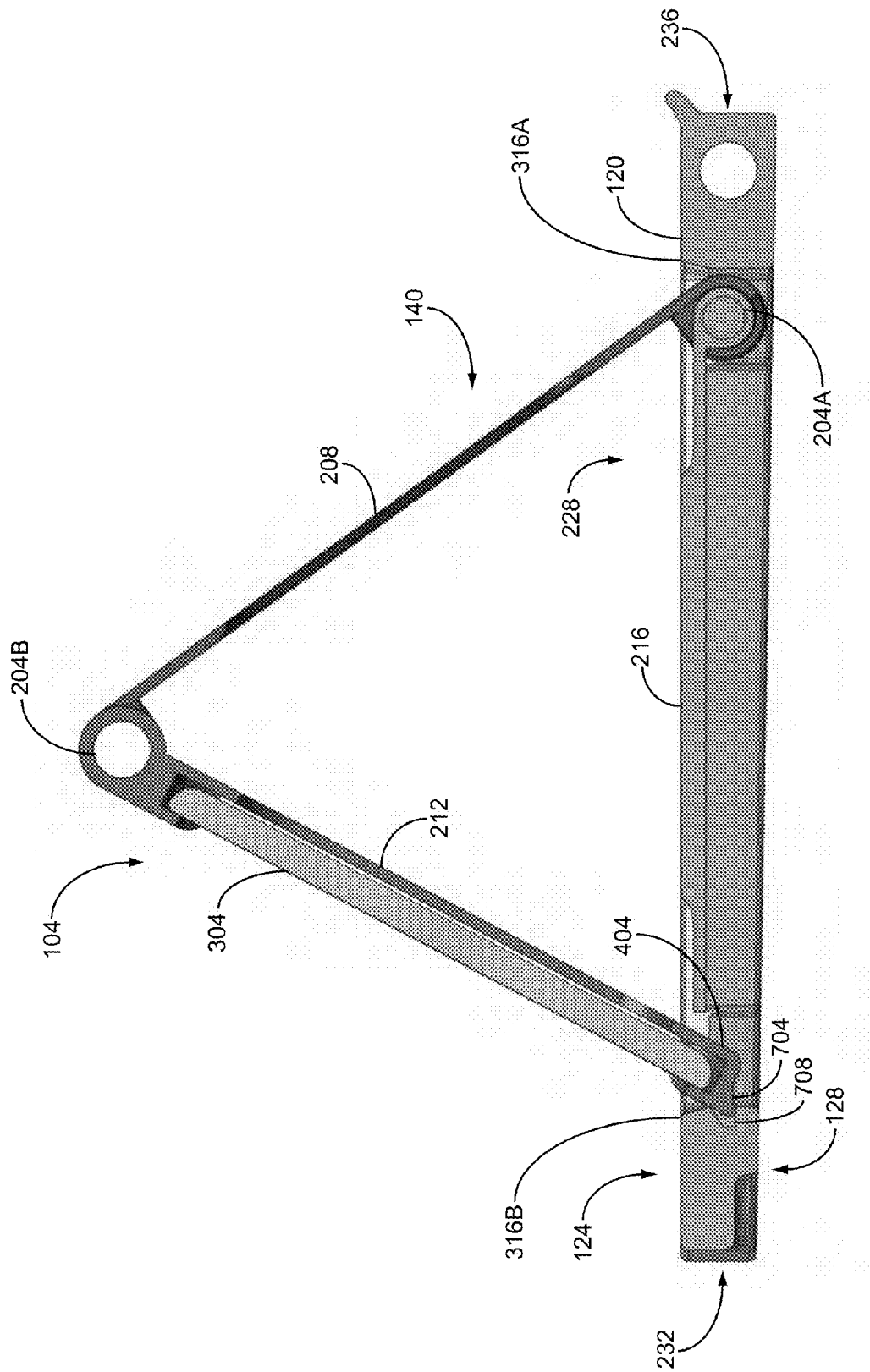
FIG. 7C is a side cross sectional view illustrating operation of an articulating support having a dual jointed configuration while in an extended position.
Figure 7D:
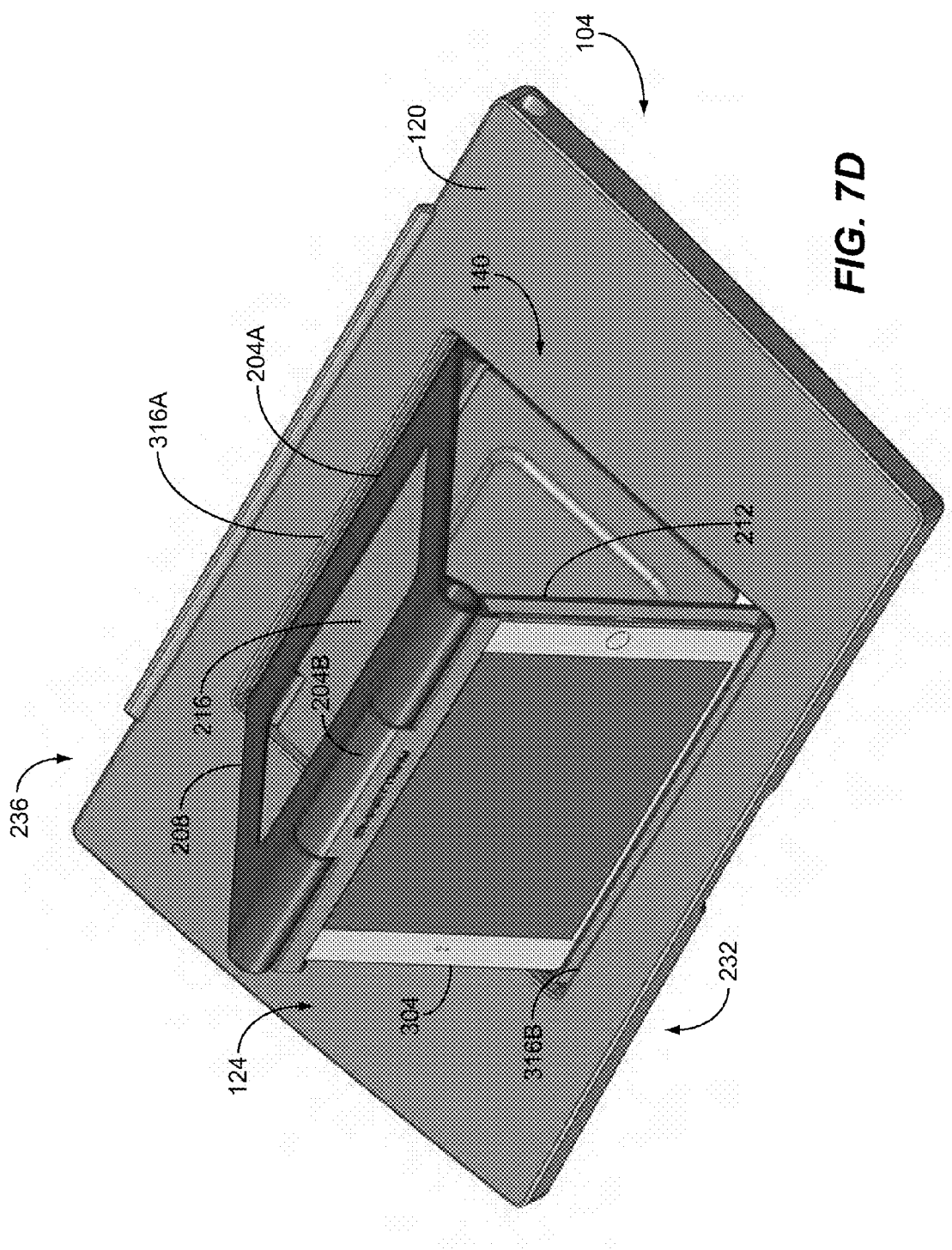
FIG. 7D is top perspective view illustrating operation of an articulating support having a dual jointed configuration while in an extended position.

FIG. 7B is a side cross sectional view illustrating transition of the articulating mount from the extended position of FIG. 7A to the extended position shown in FIGS. 7C-7D. As can be seen from FIGS. 7C-7D, this extended position locates the portable electronic device 304 at a front end 232 of the tray table 104 where it is closer to a passenger. This locates the portable electronic device 304 within convenient reach of the passenger. For instance, it can be seen that a passenger may easily interact or otherwise access the display screen or other input devices of the portable electronic device 304 at this extended position.

To achieve the extended position of FIGS. 7C-7D, the second rotating section 212 may be rotated outward toward the front end 232 of the tray table 104 about the second rotating joint 204B, such as shown in FIG. 7B. The third rotating section 216 may optionally be rotated outward toward the front end 232 of the tray table 104 as well. As shown in FIG. 7C, the first rotating section 208 may then be rotated forward such that a bottom 404 of the second rotating section 212 engages a portion of the front end 232 of the tray table 104 near or at the interior front wall 316B. In one or more embodiments, the bottom 404 of the second rotating section 212 and the interior front wall 316 may be configured to engage one another, thus securing the articulating support 140 in the extended position. For instance, as shown in FIG. 7C, it can be seen that the bottom 404 includes a protruding tab 704 configured to engage a corresponding notch 708 at the interior front wall 316B. This supports the articulating support 140 at the front end 232 of the tray table 104 when extended.

Referring to FIG. 7D, which illustrates a top perspective view of the articulating support 140 of a tray table 104, it can be seen that the rotating sections 208, 212, 216 may be shaped to conform to one another such as to allow the articulating support to provide a planar support generally flush or coplanar with the top surface 124 of the tray table 104 when the articulating support is in a retracted position. To illustrate, it can be seen from FIG. 7D, that a central portion of the third rotating section 216 protrudes outward to fill the opening 712 of the frame formed by the first rotating section 208. When retracted, the third rotating section 216 and first rotating section 208 combine to form a planar surface, such as shown in FIG. 6C. It is noted that, in one or more embodiments, the first rotating section 208 may be a continuous planar structure thereby negating the need for a protrusion on the third rotating section 216. The open frame construction of the first rotating section 208 shown in FIG. 7D is advantageous however in that it reduces the weight of the articulating support 140 as well as the tray table 104 itself. In addition, the open frame allows the third rotating section 216 to be easily inspected and cleaned while the articulating support is in a retracted position.

As can be seen, the tray table 104 and articulating support 140 herein are a significant improvement over conventional food trays. The tray table 104 and articulating support 140 accommodate the current and coming models of inflight entertainment can be configured as a retrofit to conventional food trays. In addition, since portable electronic devices are removable from as well as rechargeable at the articulating support 140, the logistics and costs associated with supporting an inflight entertainment system is greatly reduced by removing workload from inflight and other transportation personnel.

Various other configurations are also contemplated herein. For example, portable electronic devices may be charged inside by a tray table when in a stowed position via magnetic contact or wirelessly, such as by induction. The cutout in the articulating support makes it possible to easily clean filler plate between flights. A spring-loaded ball-mechanism is provided for quick access to a portable electronic device (unlocking and locking of tablet device frame).

Portable electronic devices may slide from the right side for quick storage of tablet devices inside tray tables by passengers or flight crews. In addition, the articulating support can be configured to accommodate insertion of a portable electronic device in a case or enclosure to quickly secure and remove portable electronic devices to and from an articulating support.

Such enclosure may have a magnetic connector or induction receiving coil to facilitate charging of a portable electronic device from a power source coupled to the articulating support. In one or more embodiments, the enclosure may tilt and/or rotate on an axis so to allow positioning of a portable electronic device in landscape or portrait positions. An enclosure may also be configured as an adapter to allow smaller portable electronic devices to snugly engage a mount of the articulating support. In this manner, a portable electronic device in a smartphone sized form factor may be used with an articulating support sized for a tablet sized portable electronic device.

The articulating mount's frame can be sealed (making removal of tablets impossible by passengers), or open for insertion/removal of tablets for passenger's owned tablet devices. In some embodiments, a polycarbonate protective/ touch capacitive shield or cover is provided. This may be used to qualify portable electronic devices to be used gate-to-gate increasing passenger's usage time.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A tray table comprising:
an articulating support for securing and supporting a portable electronic device at a plurality of positions, the articulating support comprising:
a first rotating joint;
a second rotating joint;
a first rotating section between the first rotating joint and the second rotating joint; and
a second rotating section comprising a mount for accepting and securing the portable electronic device thereto, the second rotating section attached to the second rotating joint;
a body comprising a top surface, a bottom surface, a front end, and a back end; and
an opening through the body extending from the top surface through to the bottom surface, the opening defined by a front wall, a back wall, and two side walls;
wherein the first rotating joint rotatably attaches the articulating support to the back wall at the back end of the body such that the articulating support is rotatable between a retracted position where the articulating support is within the opening and an extended position where the articulating support extends outward from the top surface of the body.

2. The tray table of claim 1, wherein the articulating support further comprises
a third rotating section having a planar structure, the third rotating section attached to the first rotating joint.

3. The tray table of claim 1, wherein the articulating support further comprises:
a third rotating joint attached to a distal end of the second rotating section; and
a third rotating section having a planar structure, the third rotating section attached to the third rotating joint.

4. A tray table comprising:
an articulating support for securing and supporting a portable electronic device at a plurality of positions, the articulating support comprising:
a first rotating joint;
a second rotating joint;
a first rotating section between the first rotating joint and the second rotating joint; and
a second rotating section comprising a mount for accepting and securing the portable electronic device thereto, the second rotating section attached to the second rotating joint;
a body having a first end and a second end; and
an opening in the body;
wherein the first rotating joint rotatably attaches the articulating support to the body at the second end.

* * * * *